US 10,744,970 B2

(12) United States Patent
Ohno et al.

(10) Patent No.: US 10,744,970 B2
(45) Date of Patent: Aug. 18, 2020

(54) SIDE AIRBAG DEVICE-INSTALLED VEHICLE SEAT

(71) Applicant: TOYOTA JIDOSHA KABUSHIKI KAISHA, Toyota-shi, Aichi-ken (JP)

(72) Inventors: Mitsuyoshi Ohno, Miyoshi (JP); Hiroe Sugawara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 15/987,177

(22) Filed: May 23, 2018

(65) Prior Publication Data

US 2019/0023217 A1    Jan. 24, 2019

(30) Foreign Application Priority Data

Jul. 18, 2017    (JP) .................................. 2017-139529

(51) Int. Cl.
| | |
|---|---|
| *B60R 21/2165* | (2011.01) |
| *B60R 21/215* | (2011.01) |
| *B60R 21/33* | (2006.01) |
| *B60R 21/207* | (2006.01) |
| *B60R 21/231* | (2011.01) |

(Continued)

(52) U.S. Cl.
CPC ........ *B60R 21/2165* (2013.01); *B60R 21/207* (2013.01); *B60R 21/215* (2013.01); *B60R 21/233* (2013.01); *B60R 21/23138* (2013.01); *B60R 21/33* (2013.01); *B60R 2021/0006* (2013.01); *B60R 2021/21531* (2013.01); *B60R 2021/23146* (2013.01); *B60R 2021/23308* (2013.01)

(58) Field of Classification Search
CPC ............ B60R 21/207; B60R 21/23138; B60R 2021/0006; B60R 2021/23146
See application file for complete search history.

(56) References Cited

U.S. PATENT DOCUMENTS

| | | | |
|---|---|---|---|
| 6,439,597 B1 * | 8/2002 | Harada ................. | B60R 21/207 280/728.2 |
| 9,409,540 B2 * | 8/2016 | Fujiwara ............... | B60R 21/207 |
| 9,539,975 B2 * | 1/2017 | Tanabe .................... | B60N 2/68 |

(Continued)

FOREIGN PATENT DOCUMENTS

| | | |
|---|---|---|
| JP | 2003-341461 A | 12/2003 |
| JP | 2008-87631 A | 4/2008 |

(Continued)

*Primary Examiner* — Paul N Dickson
*Assistant Examiner* — Joselynn Y Sliteris
(74) *Attorney, Agent, or Firm* — Oliff PLC

(57) ABSTRACT

A side airbag device-installed vehicle seat including a side frame, a side airbag, a front side cover, and a low extendibility member is provided. The side frame is disposed within a side section of a seatback. The side airbag is stowed within the side section, receives gas supplied from an inflator to inflate and deploy alongside a seated occupant, and includes an inner bag that inflates between the side frame and the seated occupant. The front side cover configures part of a cover of the seatback, and is interposed between the inner bag and the seated occupant when the inner bag is inflated. The low extendibility member is configured to stretch less readily than the front side cover, and is bound to a back face of the front side cover.

10 Claims, 11 Drawing Sheets

(51) Int. Cl.
 *B60R 21/233* (2006.01)
 *B60R 21/00* (2006.01)

(56) References Cited

U.S. PATENT DOCUMENTS

| | | | |
|---|---|---|---|
| 9,688,231 B2* | 6/2017 | Saito | B60R 21/2176 |
| 9,707,917 B2* | 7/2017 | Shiga | B60R 21/207 |
| 9,738,197 B2* | 8/2017 | Tanabe | B60R 21/207 |
| 10,293,721 B2* | 5/2019 | Tanabe | B60N 2/68 |
| 2007/0273129 A1 | 11/2007 | Inoue | |
| 2009/0020988 A1 | 1/2009 | Sato et al. | |
| 2016/0167611 A1 | 6/2016 | Fujiwara | |
| 2017/0174174 A1 | 6/2017 | Ohno et al. | |
| 2017/0225640 A1 | 8/2017 | Ohno | |

FOREIGN PATENT DOCUMENTS

| | | |
|---|---|---|
| JP | 2009-23494 A | 2/2009 |
| JP | 2014-80169 A | 5/2014 |
| JP | 2017-109623 A | 6/2017 |
| JP | 2017-140945 A | 8/2017 |
| JP | 2018-176884 A | 11/2018 |

* cited by examiner

SIDE AIRBAG DEVICE-INSTALLED VEHICLE SEAT

CROSS-REFERENCE TO RELATED APPLICATION

This application is based on and claims priority under 35 USC 119 from Japanese Patent Application No. 2017-139529 filed on Jul. 18, 2017, the disclosure of which is incorporated by reference herein.

BACKGROUND

Technical Field

The present disclosure relates to a side airbag device-installed vehicle seat.

Related Art

Japanese Patent Application Laid-Open (JP-A) No. 2014-080169 describes a side airbag device-installed vehicle seat in which a side airbag including a forward-deploying airbag and an inward-inflating airbag, and a single inflator that generates gas within the side airbag in a side collision, are disposed within a side section on a vehicle width direction outer side of a seatback. The forward-deploying airbag inflates and deploys between an occupant and a vehicle body side section while splitting open a planned splitting portion (seam) set in a seatback cover. The inward-inflating airbag (inner bag) inflates within the seatback toward the occupant earlier than the forward-deploying airbag, and pushes the occupant toward a vehicle inner side.

JP-A No. 2008-087631 describes a side airbag device in which two inflators are disposed within a side section on a vehicle width direction outer side of a seatback. In a side collision, the inflators generate gas in respective inflating sections, namely a main inflating section and an auxiliary inflating section. The main inflating section inflates and deploys between an occupant and a vehicle side wall while splitting open a planned splitting portion set in a seatback cover. The auxiliary inflating section (inner bag) is disposed at a position further toward the vehicle inner side than the main inflating section, and inflates and deploys within the seatback earlier than the main inflating section, and pushes the occupant obliquely toward the vehicle front and the vehicle inner side.

In the above related art, the occupant can be moved toward the vehicle inner side at an early stage by pushing force of the inner bag that inflates early within the seatback. This thereby enables effective occupant protection even in cases in which, for example, the other vehicle in the side collision is what is referred to as a sports utility vehicle or the like that causes a vehicle body side section of the vehicle itself to intrude to a large extent toward the vehicle inner side.

However, in inner bags such as those described above, the occupant is pushed via the seatback cover before the planned splitting portion set in the seatback cover splits open. There is thus an issue in that an occupant-pushing force (occupant-restraint force) of the inner bag changes depending on differences in the properties (coefficients of extension) of the cover. Namely, for example, genuine leather covers do not stretch readily, while knitted-material covers do stretch readily. The side airbag device set with an inner bag occupant-pushing force adapted for a genuine leather cover would therefore apply an excessive inner bag occupant-pushing force if applied to a vehicle seat with a knitted cover. Conversely, were a side airbag device set with an inner bag occupant-pushing force adapted for a knitted cover to be applied to a vehicle seat with a genuine leather cover, the inner bag occupant-pushing force would be insufficient.

For this reason, it is difficult to employ, without modification, common side airbag devices provided with inner bags having the same specifications as each other in vehicle seats that have covers of greatly different coefficients of extension.

SUMMARY

In consideration of the above circumstances, the present disclosure provides a side airbag device-installed vehicle seat that is capable of preventing an excessive inner bag occupant-pushing force from arising due to a cover of a seatback stretching, even when the seatback cover is configured using a material that stretches readily.

A side airbag device-installed vehicle seat according to a first aspect of the present disclosure includes a side frame, a side airbag, a front side cover, and a low extendibility member. The side frame is disposed within a side section of a seatback. The side airbag is stowed within the side section, receives gas supplied from an inflator to inflate and deploy alongside a seated occupant, and includes an inner bag that inflates between the side frame and the seated occupant. The front side cover configures part of a cover of the seatback, and is interposed between the inner bag and the seated occupant when the inner bag is inflated. The low extendibility member is configured to stretch less readily than the front side cover, and is bound to a back face of the front side cover.

In the first aspect of the present disclosure, the inflator is actuated when a side collision of the vehicle has been detected or predicted. When this occurs, the side airbag stowed within the side section of the seatback receives gas supplied from the inflator and inflates and deploys alongside the seated occupant. The side airbag includes the inner bag that is disposed within the side section and that inflates between the side frame and the seated occupant. The front side cover configuring part of the seatback cover is interposed between the inflated inner bag and the seated occupant. The low extendibility member that is configured to stretch less readily than the front side cover is bound to the back face of the front side cover. The front side cover is thus suppressed from stretching under inflation pressure from the inner bag. The force with which the inner bag pushes the seated occupant (occupant-pushing force of the inner bag) can accordingly be prevented from becoming excessive as a result of stretching of the front side cover (part of the cover), even in cases in which the cover including the front side cover is configured from a material that stretches readily.

A side airbag device-installed vehicle seat according to a second aspect of the present disclosure is the first aspect, configured such that, when the seated occupant is an AM50 world side impact dummy, the inflated inner bag and the low extendibility member overlap with rear portions of at least a lower three ribs out of six ribs provided to the torso of the dummy in seat side view.

In the second aspect of the present disclosure, when the seated occupant is an AM50 world side impact dummy, the inflated inner bag overlaps with rear portions of at least the lower three ribs out of the six ribs provided to the torso of the dummy in seat side view. Accordingly, at least the rear portion of the lower three ribs are pushed by the inner bag. Note that the lower three ribs are locations included at the chest and belly of the dummy (locations with relatively low resistance values for a human body). It is therefore not desirable for these locations to receive excessive pushing force from the inner bag. Regarding this point, in the present disclosure, the low extendibility member bound to the back face of the front side cover is disposed overlapping the rear portion of at least the three lower ribs in seat side view. Accordingly, stretching of the front side cover is suppressed in a region overlapping with the rear portion of at least the three lower ribs in seat side view, thereby enabling the chest and belly of the dummy (seated occupant) to be prevented from receiving an excessively large pushing force from the inner bag.

A side airbag device-installed vehicle seat according to a third aspect of the present disclosure is either the first or the second aspect, wherein the cover of the seatback includes a side cover that is joined to the front side cover at a planned splitting portion set at a front edge of the side section. The planned splitting portion is configured to split open on receipt of inflation pressure from the side airbag. Moreover, a front edge of the low extendibility member is joined to the planned splitting portion, and a rear edge of the low extendibility member is coupled to the side frame.

In the third aspect of the present disclosure, the front side cover, including the seatback cover, and the side cover are joined to each other at the planned splitting portion set at the front edge of the seatback side section. The planned splitting portion is configured to split open on receipt of inflation pressure from the side airbag. The front edge of the low extendibility member is joined to the planned splitting portion, and the rear edge of the low extendibility member is coupled to the side frame. Accordingly, inflation pressure of the side airbag acts, via the low extendibility member, as tensile force on the planned splitting portion. This enables the planned splitting portion to be split smoothly, thereby enabling the deployment performance of the side airbag to be improved.

A side airbag device-installed vehicle seat of a fourth aspect of the present disclosure is the third aspect, further including another low extendibility member that is configured to stretch less readily than the side cover, that is disposed following a back face of the side cover, that has a front edge joined to the planned splitting portion, and that has a rear edge coupled to the side frame.

In the fourth aspect of the present disclosure, the other low extendibility member that is configured to stretch less readily than the side cover is disposed following the back face of the side cover. The front edge of the other low extendibility member is joined to the planned splitting portion of the seatback cover, and the rear edge of the other low extendibility member is coupled to the side frame. Accordingly, inflation pressure of the side airbag acts, via not only the low extendibility member but also via the other low extendibility member, as tensile force on the planned splitting portion. This thereby enables the planned splitting portion to be split open even more smoothly, thereby enabling a further improvement to the deployment performance of the side airbag.

A side airbag device-installed vehicle seat according to a fifth aspect of the present disclosure is the fourth aspect, wherein the other low extendibility member is a reinforcement cloth with a smaller dimension than the low extendibility member in a vertical direction of the seatback.

In the fifth aspect of the present disclosure, the other low extendibility member disposed following the back face of the front side cover is a reinforcement cloth with a smaller dimension in the vertical direction of the seatback than the low extendibility member bound to the back face of the front side cover. Due to the reinforcement cloth with a small dimension in the vertical direction of the seatback receiving inflation pressure from the side airbag and pulling on the planned splitting portion, tensile force is concentrated on part of the planned splitting portion (locations where the front edge of the reinforcement cloth are joined). The planned splitting portion can thus be split smoothly from this portion.

As described above, a side airbag device-installed vehicle seat according to the present disclosure is capable of preventing an excessive inner bag occupant-pushing force from arising due to a cover of a seatback stretching, even when the seatback cover is configured using a material that stretches readily.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
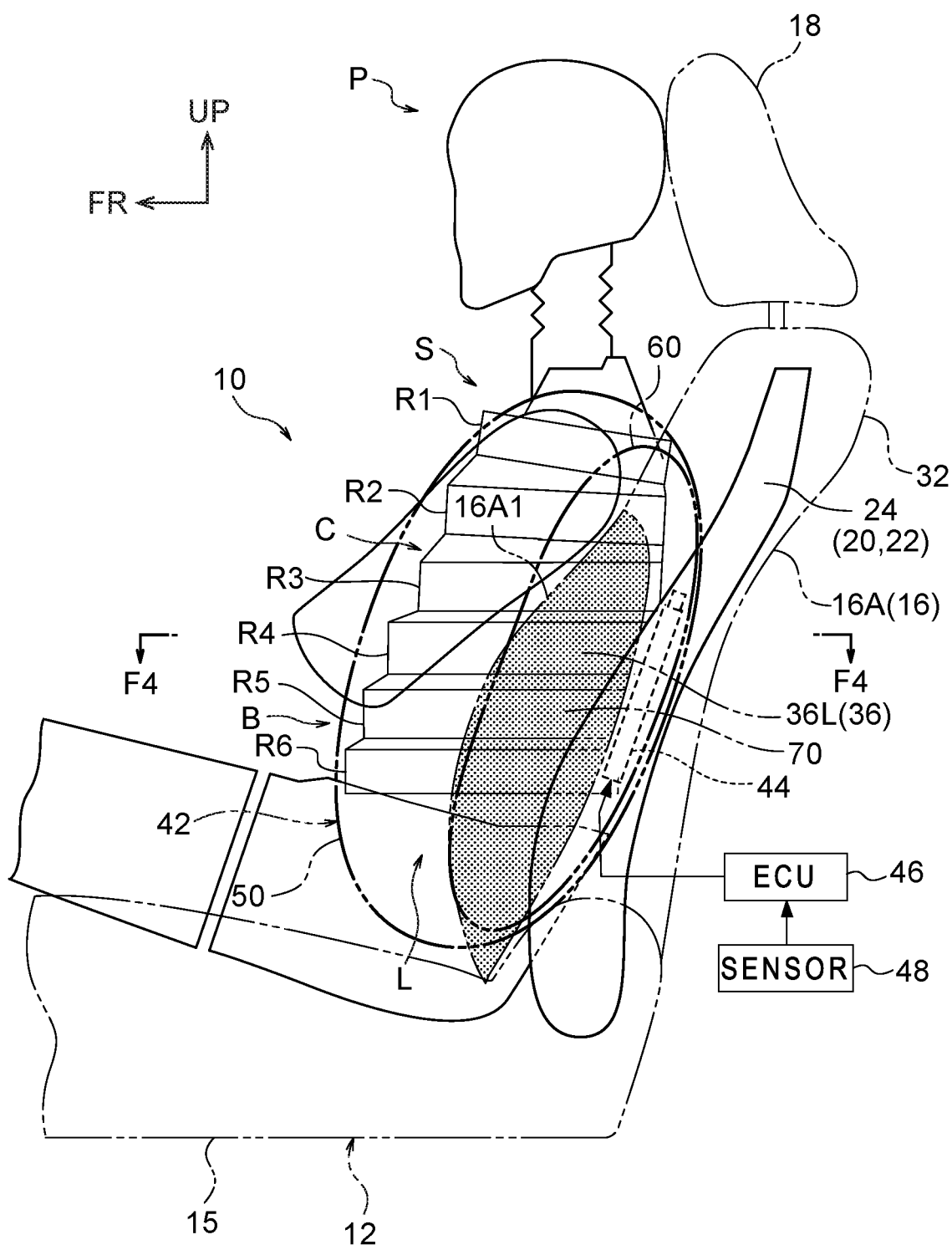
FIG. 1 is a side view illustrating a side airbag device-installed vehicle seat according to a first exemplary embodiment of the present disclosure, in an inflated and deployed state of a side airbag.

Explanation follows regarding a side airbag device-installed vehicle seat 10 (abbreviated to "vehicle seat 10" hereafter) according to a first exemplary embodiment of the present disclosure, with reference to FIG. 1 to FIG. 5. Note that, where appropriate in the drawings, the arrow FR points toward the vehicle front, the arrow UP points toward the vehicle upper side, and the arrow LH (OUT) points toward the left of the vehicle (vehicle width direction outer side). In the following explanation, unless explicitly stated otherwise, reference simply to the front and rear, left and right, and up and down refer respectively to the front and rear in a vehicle front-rear direction, left and right in a vehicle left-right direction (vehicle width direction), and up and down in a vehicle vertical direction. Moreover, in order to facilitate viewing of the drawings, some reference numerals and some members are omitted in the respective drawings.

As illustrated in FIG. 1, the vehicle seat 10 according to the present exemplary embodiment includes a seat body 12 and a side airbag device 14. The vehicle seat 10 is, for example, a driver's seat of a left hand drive vehicle, or a passenger seat of a right hand drive vehicle, disposed on the left side of the interior of the vehicle cabin. The front-rear direction, left-right direction (width direction) and vertical direction of the vehicle seat 10 respectively correspond to the front-rear direction, left-right direction (width direction), and vertical direction of the vehicle. Were the side airbag device-installed vehicle seat 10 to be disposed on the right side of the interior of the vehicle cabin then the configuration would have left-right symmetry to that of the present exemplary embodiment. The configuration of the seat body 12 and the side airbag device 14 will be explained in sequence below, followed by explanation regarding relevant portions of the present exemplary embodiment.

Basic Configuration of the Seat Body 12

Figure 2:
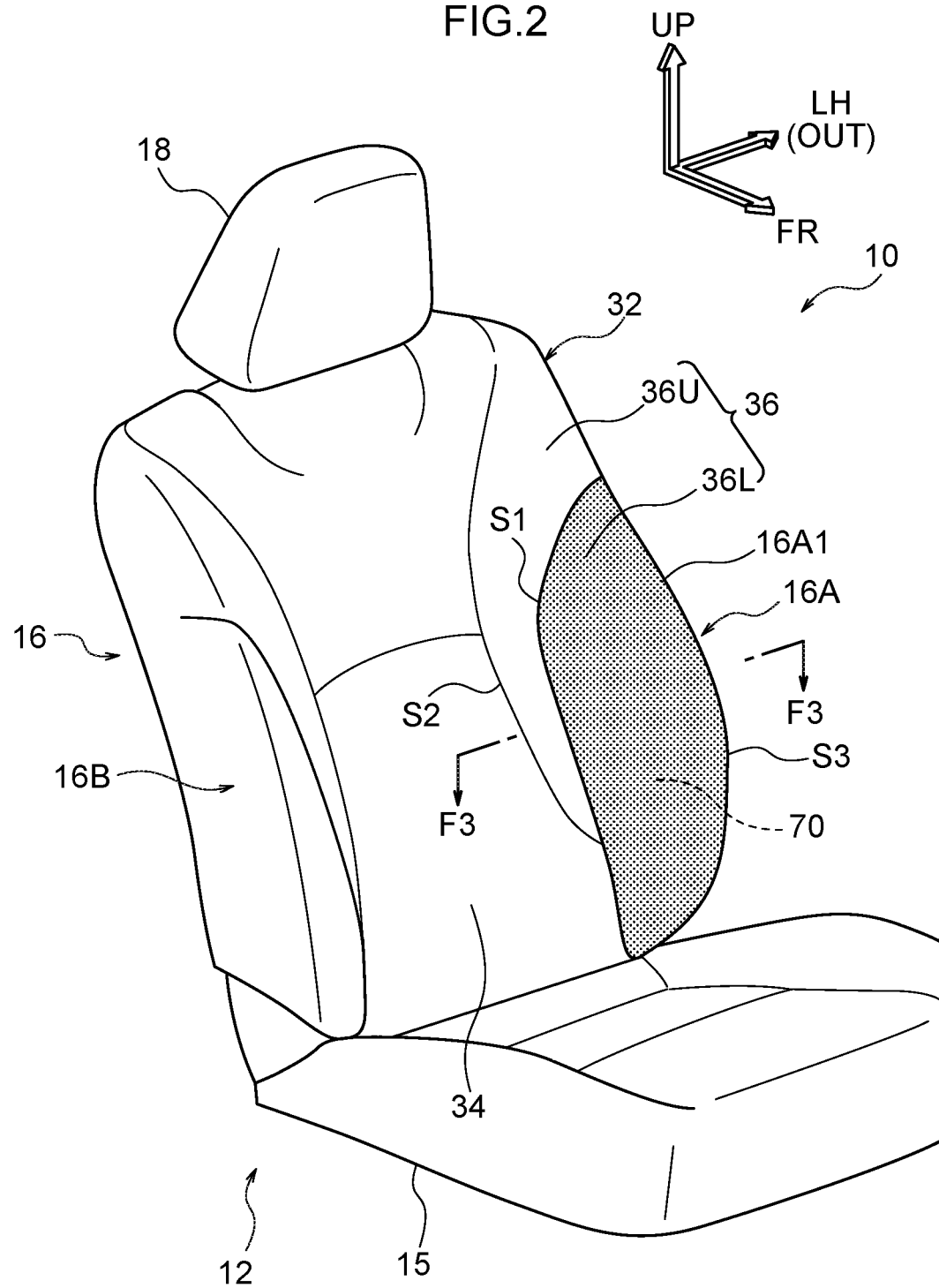
FIG. 2 is a perspective view illustrating a side airbag device-installed vehicle seat according to the first exemplary embodiment as viewed obliquely from the front right of the vehicle, illustrating a stowed state of a side airbag.

As illustrated in FIG. 1 and FIG. 2, the seat body 12 includes a seat cushion 15 that supports the buttocks and thighs of a seated occupant P, a seatback 16 that is coupled to a rear end portion of the seat cushion 15 and that supports the back of the seated occupant P, and a headrest 18 that is coupled to an upper end portion of the seatback 16 and that supports the head of the seated occupant P.

Note that in FIG. 1, a crash test dummy P is seated in the seat body 12 in the place of a real occupant. Moreover, in FIG. 3 and FIG. 4, the torso of the dummy P is schematically illustrated by double-dash broken lines. The dummy P is an AM50 (American adult male $50^{th}$ percentile) world side impact dummy (WorldSID). The dummy P is seated on the seat body 12 using the seating method stipulated for a side collision test method, and the front-rear position of the seat body 12 with respect to the vehicle, and the angle of inclination of the seatback 16 with respect to the seat cushion 15, are adjusted to standard setting positions corresponding to those set out in the seating method referred to above. In this state, the front-rear, left-right, and vertical directions of the seatback 16 correspond to the front-rear, left-right, and vertical directions of the vehicle.

The torso of the dummy P includes six pairs of ribs R1, R2, R3, R4, R5, R6. The ribs R1, R2, R3, R4, R5, R6 are also referred to as follows, in sequence from the top: shoulder ribs R1; upper chest ribs R2; mid-chest ribs R3; lower chest ribs R4; upper belly ribs R5; and lower belly ribs R6. The shoulder ribs R1 are provided at the shoulders S of the dummy P. The upper chest ribs R2, the mid-chest ribs R3, and the lower chest ribs R4 are provided at the chest C of the dummy P. The upper belly ribs R5 and the lower belly rib R6 are provided at the belly B of the dummy P. The dummy P is also sometimes referred to as the seated occupant P in the following explanation.

Figure 3:
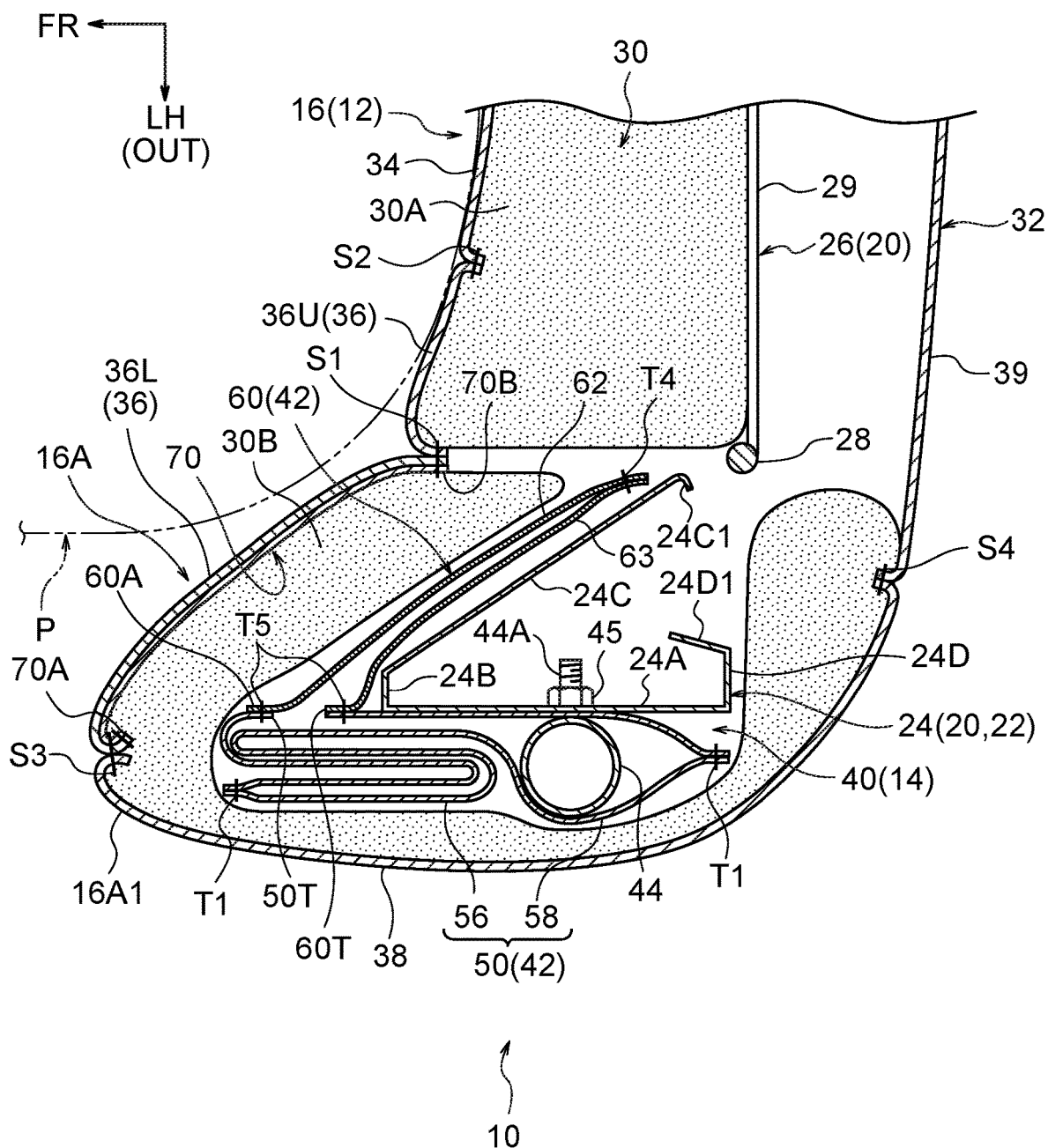
FIG. 3 is an enlarged cross-section illustrating a plane sectioned along line F3-F3 in FIG. 2.
Figure 4:
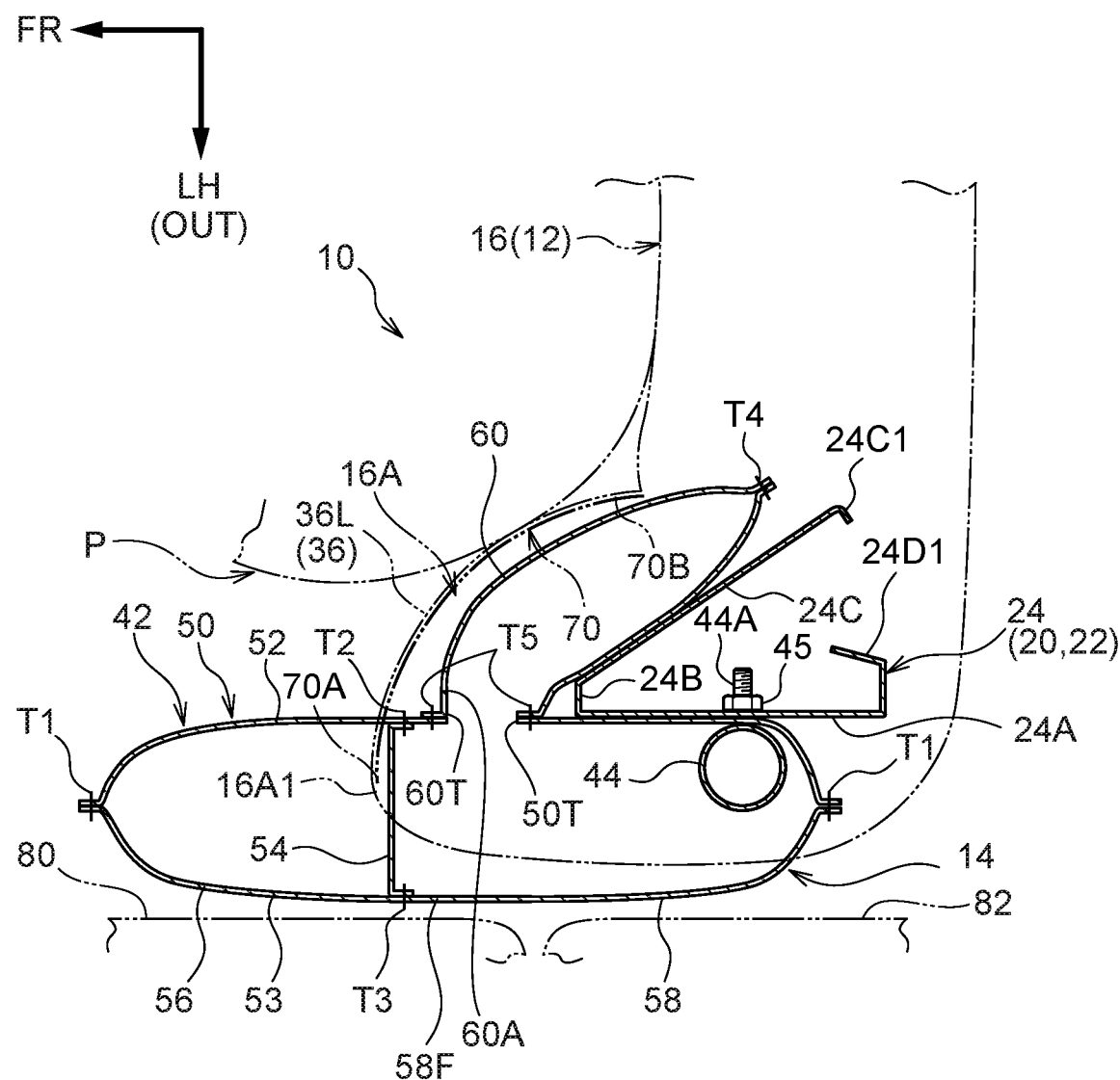
FIG. 4 is an enlarged cross-section illustrating a plane sectioned along line F4-F4 in FIG. 1, in an inflated and deployed state of a side airbag.

As illustrated in FIG. 1, FIG. 3, and FIG. 4, the seatback 16 includes a metal seatback frame 22, this being a framework member, and a seatback spring 26 (omitted from illustration except in FIG. 3) that is attached to the seatback frame 22. The seatback frame 22 and the seatback spring 26 configure a frame section 20 of the seatback 16. Moreover, as illustrated in FIG. 3, the seatback 16 includes a seatback pad 30 (omitted from illustration except in FIG. 3) fitted over the frame section 20, and a seatback cover 32 covering the seatback pad 30. The seatback cover 32 corresponds to a "cover of the seatback" in the present exemplary embodiment.

The seatback frame 22 includes an outer side-frame 24 disposed within a vehicle width direction outer side section 16A of the seatback 16, and an inner side-frame (not illustrated in the drawings) disposed within a vehicle width direction inner side section 16B (see FIG. 2) of the seatback 16. The seatback frame 22 also includes an upper frame, not illustrated in the drawings, linking together upper ends of the outer side-frame 24 and the inner side-frame, and a lower frame, not illustrated in the drawings, linking together lower ends of the outer side-frame 24 and the inner side-frame in the seat width direction. The side section 16A corresponds to a "side section of the seatback" of the present disclosure, and the outer side-frame 24 corresponds to a "side-frame" of the present disclosure. In the following explanation, the side section 16A is referred to as the "outer side section 16A", and the side section 16B is referred to as the "inner side section 16B".

As illustrated in FIG. 3 and FIG. 4, the outer side-frame 24 is configured by an outer wall 24A, a front wall 24B, an inner wall 24C, and a rear flange 24D. The outer wall 24A extends along the front-rear direction of the seatback 16 as viewed along a height direction of the seatback 16. The front wall 24B extends from a front end of the outer wall 24A toward the seat width direction inner side. The inner wall 24C extends obliquely from a seat width direction inner side end of the front wall 24B, extending at the seat width direction inner side obliquely toward the seat rear. A leading end 24C1 of the inner wall 24C is bent obliquely toward the seat width direction outer side and rear. The rear flange 24D extends from a rear end of the outer wall 24A toward the seat width direction inner side. A leading end 24D1 side of the rear flange 24D is bent obliquely toward the seat front and the seat width direction inner side. Note that the inner side-frame described above is formed with left-right symmetry to the outer side-frame 24, but otherwise has the same configuration as the outer side-frame 24.

The seatback spring 26 (see FIG. 3) is disposed toward the seat width direction center and seat rear within the seatback 16. The seatback spring 26 is configured by side wires 28, serving as a pair of left and right wire members, extending in the height direction of the seatback 16, and by plural S-springs 29 spanning between the left and right side wires 28. Upper ends of the left and right side wires 28 are fixed to the upper frame described above. Moreover, vertical direction intermediate portions of the left and right side wires 28 are fixed to the outer side-frame 24 and the inner side-frame by plural hooks, not illustrated in the drawings.

The seatback pad 30 (see FIG. 3) is a foamed body of urethane foam or the like, and is configured by a pad center portion 30A provided at a seat width direction intermediate portion of the seatback 16, an outer pad side portion 30B provided to the outer side section 16A of the seatback 16, and an inner pad side portion (not illustrated in the drawings) provided to the inner side section 16B of the seatback 16. The pad center portion 30A is disposed at the width direction center of the seatback 16, and is supported from the seat rear by the seatback spring 26. The outer pad side portion 30B and the inner pad side portion are each formed with a substantially C-shaped profile in horizontal cross-section. The outer pad side portion 30B is housed within the outer side-frame 24, and the inner pad side portion is housed within the inner side-frame. The outer pad side portion 30B and the inner pad side portion protrude further toward the seat front than the pad center portion 30A, and are shaped so as to secure side-support-characteristics for the seated occupant P.

As illustrated in FIG. 3, the seatback cover 32 includes a front cover 34 covering a front face of the pad center portion 30A, an outer front side cover 36 covering a front face of the outer pad side portion 30B, an outer side cover 38 covering a side face on the vehicle width direction outer side of the outer pad side portion 30B, and a rear cover 39 covering a rear face of the pad center portion 30A. The material used in each of the covers configuring the seatback cover 32 is a knitted material (knitted fabric) in the present exemplary embodiment, which is a comparatively easy-to-stretch material. Note that although illustration of the configuration of the inner side section 16B of the seatback 16 in cross-section is omitted, the seatback 16 is configured with left-right symmetry (see FIG. 2). The material used for each of the covers configuring the seatback cover 32 is not limited to being a knitted material, and may be a fabric (woven material), synthetic leather, or the like. Although not explained in detail, a cover of the seat cushion 15 (seat cushion cover) is also manufactured using the same material as the material of the seatback cover 32.

The outer front side cover 36 corresponds to a "front side cover" of the present disclosure. As illustrated in FIG. 2 and FIG. 3, in the present exemplary embodiment, the outer front side cover 36 is configured by stitching (joining, same applies hereafter) an upper section 36U and a lower section 36L together at a seam S1. The upper section 36U configures a portion to the rear (seat width direction inner side) of and above a vertical direction intermediate portion of the outer front side cover 36, and the lower section 36L configures a portion to the front (seat width direction outer side) of and below the vertical direction intermediate portion of the outer front side cover 36.

As illustrated in FIG. 3, a vehicle width direction inner side edge of the outer front side cover 36 is stitched to a vehicle width direction outer side edge of the front cover 34 at a seam S2. A vehicle width direction outer side edge of the outer front side cover 36 is stitched to a front edge of the outer side cover 38 at a seam S3. A rear edge of the outer side cover 38 is stitched to a vehicle width direction outer side edge of the rear cover 39 at a seam S4. The seam S3 between the outer front side cover 36 and the outer side cover 38 is positioned at a front edge 16A1 of the outer side section 16A (at what is referred to as a lip). The seam S3 configures a planned splitting portion (burst line) that splits open on receipt of inflation pressure of a side airbag 42, described later. The thread used for the seam S3 is a thread that snaps more easily than the thread employed at the other seams S1, S2, S4 etc. Hereafter, the seam S3 is referred to as the "planned splitting portion S3". The planned splitting portion S3 is configured to split open, together with splitting of the outer pad side portion 30B, when the side airbag 42, described later inflates and deploys.

Side Airbag Device 14 Configuration

As illustrated in FIG. 1, FIG. 3, and FIG. 4, the side airbag device 14 includes a side airbag 42 and an inflator 44. The inflator 44 generates gas on actuation, and the side airbag 42 inflates and deploys toward the side of the seated occupant P on receipt of gas supplied from the inflator 44 (the state illustrated in FIG. 1 and FIG. 4). The side airbag 42 and the inflator 44 are normally configured as an airbag module 40 as illustrated in FIG. 3, and are stowed inside the outer side section 16A of the seatback 16. Note that in the following explanation, reference to front, rear, and vertical directions with respect to the side airbag 42 refers to directions in an inflated and deployed state of the side airbag 42, and these substantially correspond to the front, rear, and vertical directions of the seatback 16.

The inflator 44 is what is referred to as a cylinder-type inflator, and is formed in a circular column shape. The inflator 44 is installed at the seat width direction outer side (vehicle width direction outer side) of the outer wall 24A of the outer side-frame 24, in an orientation in which an axial direction of the inflator 44 runs along the height direction of the seatback 16. As illustrated in FIG. 3 and FIG. 4, a pair of upper and lower stud bolts 44A project from an outer peripheral portion of the inflator 44 toward the seat width direction inner side. The stud bolts 44A pass through the outer wall 24A, and nuts 45 are screwed onto leading ends of the respective stud bolts 44A. The inflator 44 is attached thereby to the outer side-frame 24. A configuration may also be adopted in which stud bolts projecting from an outer peripheral portion of the inflator 44 toward the vehicle rear are passed from the vehicle front through a bracket or the like fixed to the outer side-frame 24 before having nuts screwed thereon (a configuration referred to as back face fastening).

Plural gas ejection ports (not illustrated in the drawings) are formed in a row around a peripheral direction of the inflator 44 at an upper end or a lower end of the inflator 44 (the lower end in this example). On activation (actuation) of the inflator 44, gas is ejected in a radiating pattern through the plural gas ejection ports. As illustrated in FIG. 1, the inflator 44 is electrically connected to a side impact ECU 46 that is installed to the vehicle. A side impact sensor 48 to detect side collisions is also electrically connected to the side impact ECU 46. The side impact ECU 46 is configured to actuate the inflator 44 when (the inevitability of) a side collision has been detected based on a signal from the side impact sensor 48. Note that in cases in which a collision prediction sensor (pre-crash sensor) that predicts (forecasts) a side collision is electrically connected to the side impact ECU 46, a configuration may be adopted in which the inflator 44 is activated when the side impact ECU 46 has predicted a side collision based on a signal from the collision prediction sensor.

As illustrated in FIG. 1 and FIG. 3 to FIG. 5, the side airbag 42 is configured by a side airbag body 50 and an inner bag 60. The side airbag body 50 inflates and deploys between the seated occupant P and a vehicle body side section (a door trim 80 of a side door and a B-pillar garnish 82 in this example, as illustrated in FIG. 4) on receipt of gas supplied from the single inflator 44 housed inside the side airbag body 50. The side airbag body 50 projects toward the seat front of the outer side section 16A during inflation and deployment. The inner bag 60 is supplied with gas from the inflator 44 via the side airbag body 50, and inflates mainly within the outer side section 16A.

The side airbag body 50 is disposed at the seat width direction outer side of the outer side-frame 24. The side airbag body 50 is formed from two base cloths 52, 53 (see FIG. 4; not indicated by reference numbers in FIG. 1 to FIG. 3) formed, for example, by cutting out substantially elliptical shapes from a nylon-based or polyester-based fabric. The side airbag body 50 is formed in a bag shape by overlaying and stitching together outer peripheral edges of the two base cloths 52, 53 at a seam T1.

The manufacturing method of the side airbag body 50 is not limited to the above, and may be modified as appropriate. For example, a configuration may be adopted in which a single base cloth is folded into two and outer peripheral edges thereof stitched to manufacture the side airbag body 50. As another example, a configuration may be adopted in which the side airbag body 50 is manufactured by a bag-weaving method (referred to as an OPW method) using an automatic loom. This point also applies to the inner bag 60 described later.

As illustrated in FIG. 4, the side airbag body 50 is installed such that in an inflated and deployed state, one base cloth 52 faces toward the seat width direction inner side (the seated occupant P side), and the other base cloth 53 faces toward the seat width direction outer side (the door trim 80 and B-pillar garnish 82 side). As viewed from the side in an inflated and deployed state, the side airbag body 50 is formed so as to exhibit a substantially elliptical shape elongated along the height direction of the seatback 16, as illustrated by the double-dash broken line in FIG. 1, and is formed with a size capable of restraining the shoulders S, chest C, belly B, and legs L of the seated occupant P.

Figure 5:
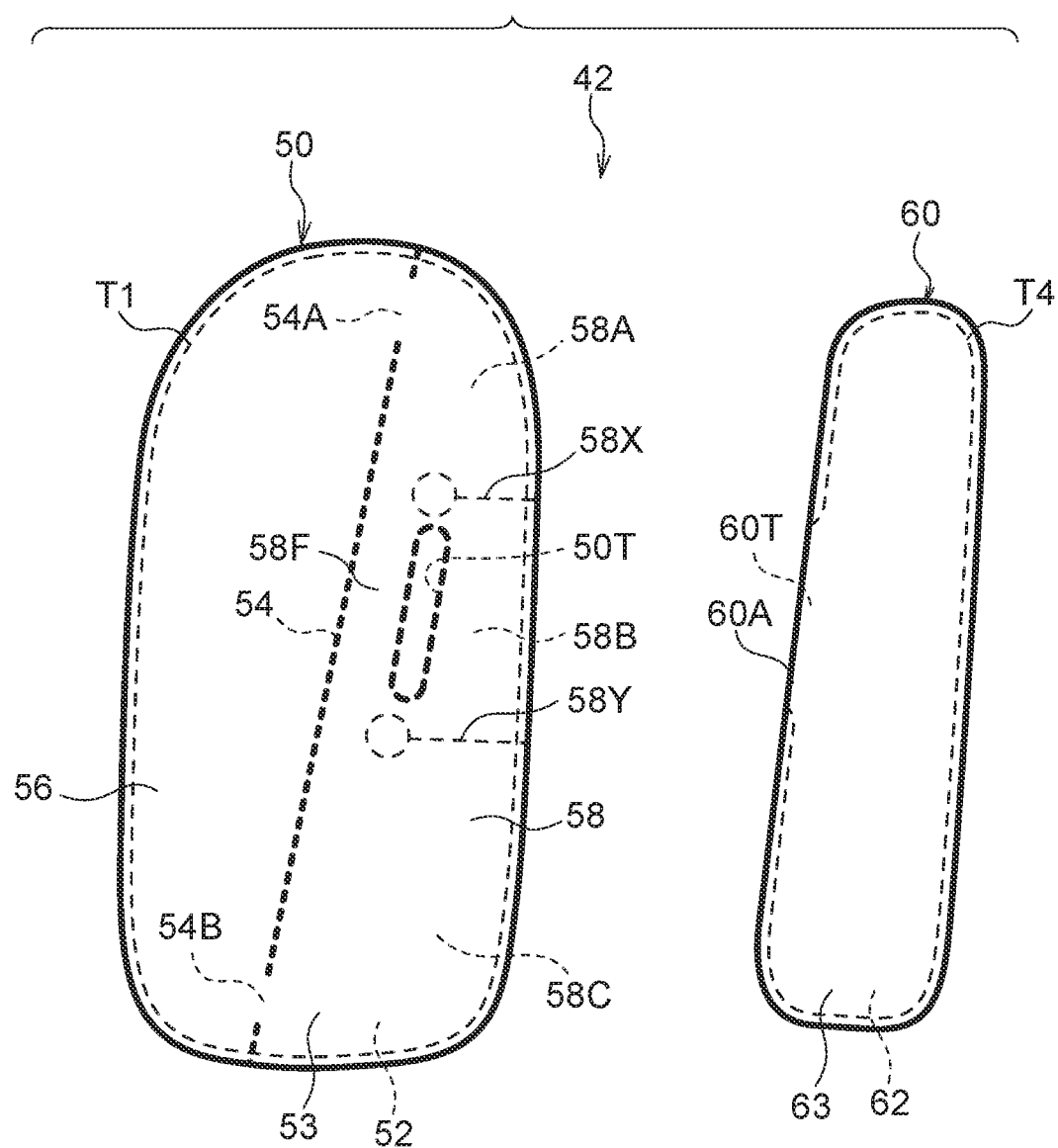
FIG. 5 is an opened-out plan view of a side airbag body and an inner bag, illustrating a state prior to joining the side airbag body and the inner bag together.

As illustrated in FIG. 4 and FIG. 5, the side airbag body 50 has a configuration in the inflated and deployed state that is partitioned by a tether 54 (partitioning cloth; omitted from illustration in FIG. 1 and FIG. 3), serving as an internally provided partition into a front chamber 56 and a rear chamber 58, which lie side-by-side along the vehicle front-rear direction. The tether 54 is formed in an elongated strap shape using a similar fabric to that of the base cloths 52, 53. One long edge of the tether 54 is stitched to the base cloth 52 at a seam T2, and the other long edge of the tether 54 is stitched to the base cloth 53 at a seam T3.

The tether 54 is set such that, in the inflated and deployed state of the side airbag body 50, the tether 54 extends along the height direction of the seatback 16 following the front edge 16A1 (the lip) of the outer side section 16A of the seatback 16. As illustrated in FIG. 5, an upper communication opening 54A is formed penetrating an upper end portion of the tether 54, and a lower communication opening 54B is formed penetrating a lower end portion of the tether 54. The interior of the front chamber 56 and the interior of the rear chamber 58 are placed in communication with each other through the upper communication opening 54A and the lower communication opening 54B.

A pair of upper and lower partitions 58X, 58Y are provided at vertical direction intermediate portions of the rear chamber 58. The upper and lower partitions 58X, 58Y are non-inflating portions configured by the stitched portions (seams) where the base cloths 52, 53 of the side airbag body 50 are stitched together. The upper and lower partitions 58X, 58Y extend from a rear edge of the rear chamber 58 toward a front end of the rear chamber 58.

Front ends of the partitions 58X, 58Y are each hemmed to prevent fraying by stitching in a circular shape. The rear chamber 58 is partitioned by the partitions 58X, 58Y into an upper chamber 58A, a vertical direction intermediate chamber 58B, and a lower chamber 58C. Note that front ends of the partitions 58X, 58Y are each positioned further toward the rear of the rear chamber 58 than the tether 54. Accordingly, the interior of the upper chamber 58A, the interior of the vertical direction intermediate chamber 58B, and the interior of the lower chamber 58C are placed in communication with each other at a front portion 58F side of the rear chamber 58.

The upper communication opening 54A described above is at a position separated from the upper partition 58X at the upper end of the side airbag 42. The lower communication opening 54B described above is at a position separated from the lower partition 58Y at the lower end of the side airbag body 50. The single inflator 44 (see FIG. 1, FIG. 3, and FIG. 4) is housed at a rear end portion within the vertical direction intermediate chamber 58B. The upper and lower stud bolts 44A of the inflator 44 (see FIG. 3 and FIG. 4) penetrate the base cloth 52, and the side airbag body 50 is fastened and fixed to a vertical direction intermediate portion of the outer wall 24A using the inflator 44.

As illustrated in FIG. 3, the side airbag body 50 configured as described above is normally stowed at the seat width direction outer side of the outer side-frame 24 in a concertinaed state, with a front location including the front chamber 56 folded over so as to overlap in the seat width direction.

A communication opening 50T (see FIG. 3 to FIG. 5; not illustrated in FIG. 1) is formed at a location in the side airbag body 50 that faces the seat width direction inner side in the inflated and deployed state and that configures the front portion 58F of the rear chamber 58. The communication opening 50T is formed at a position overlapping the front of the vertical direction intermediate chamber 58B as viewed from the side in the inflated and deployed state of the side airbag body 50. The communication opening 50T is aligned with the inner bag (inner side airbag) 60.

The inner bag 60 is formed from two base cloths 62, 63 formed by cutting out substantially elliptical shapes. The inner bag 60 is formed by overlaying and stitching together outer peripheral edges of the two base cloths 62, 63 at a seam T4. Note that the base cloths 62, 63 of the inner bag 60 are formed from a similar fabric to that used for the base cloths 52, 53 of the side airbag body 50. The inner bag 60 is set with a sufficiently smaller front-rear direction dimension than the side airbag body 50, and is set with a slightly smaller vertical direction dimension than the side airbag body 50.

The seam T4 of the inner bag 60 is absent at part of a proximal end 60A of the inner bag 60. An opening 60T is thus formed thereby at part of the proximal end 60A. As illustrated in FIG. 3 and FIG. 4, an edge of the opening 60T of the inner bag 60 is stitched to a peripheral edge of the communication opening 50T of the side airbag body 50 at a seam T5. The proximal end 60A of the inner bag 60 is thus joined to the front portion 58F of the rear chamber 58, and the interior of the front portion 58F of the rear chamber 58 and the interior of the inner bag 60 are placed in communication with each other through the communication opening 50T.

As illustrated in FIG. 3, the inner bag 60 is stowed within the outer side section 16A of the seatback 16 in a state spread out into a planar shape, with the inner bag 60 interposed between the inner wall 24C of the outer side-frame 24 and the outer pad side portion 30B. In the stowed state, the inner bag 60 is disposed at the seat front of, and close to, the front wall 24B and the inner wall 24C of the outer side-frame 24, and extends obliquely toward the seat rear on progression toward the seat width direction inner side.

Gas generated in the rear chamber 58 by the inflator 44 passes through the communication opening 50T and is supplied into the interior of the inner bag 60. The inner bag 60 is thereby inflated mainly inside the outer side section 16A. The inflated inner bag 60 faces from the vehicle width direction outer side toward the seated occupant P (overlaps in seat side view with the seated occupant P) from the shoulders S to the rear of the belly B (locations on the side of the back of the seated occupant P including locations at the rear of the ribs thereof; portions at the rear of the ribs R1, R2, R3, R4, R5, R6). The inner bag 60 also inflates toward the vehicle width direction inner side (seat width direction inner side; the seated occupant P side) on receipt of a reaction force from the inner wall 24C of the outer side-frame 24. A configuration is thereby adopted in which rear portions from the shoulders S to the belly B of the seated occupant P illustrated in FIG. 1 are pushed toward the vehicle width direction inner side by the inner bag 60, via the seatback pad 30 illustrated in FIG. 3, a lining cloth 70, described later, and the outer front side cover 36.

Relevant Portions of the Present Exemplary Embodiment

As illustrated in FIG. 1 and FIG. 4, in the present exemplary embodiment, the lower section 36L of the outer front side cover 36 is interposed between the inflated inner bag 60 and the chest C and belly B of the seated occupant P. As illustrated in FIG. 3 and FIG. 4, the lining cloth 70, serving as a low extendibility member, is bound to a back face of the lower section 36L. Note that in FIG. 1 and FIG. 2, the locations where the lining cloth 70 is arranged are shaded with dots in order to aid understanding of the locations where the lining cloth 70 is disposed. The lining cloth 70 is formed by cutting out a sheet shaped (plane shaped, cloth shaped) material in a similar shape to the lower section 36L. The lining cloth 70 is laid over the entire back face of the lower section 36L. The lining cloth 70 is bound to the lower section 36L by a method such as bonding or stitching. The material used for the lining cloth 70 is, for example, a fabric (woven material), synthetic leather, or the like, and is a material that does not stretch as readily as the material (in this cases the knitted material) of the seatback cover 32, including the lower section 36L (outer front side cover 36). The lining cloth 70 therefore stretches less readily than the lower section 36L.

As illustrated in FIG. 1, in seat side view, the lining cloth 70 is disposed so as to overlap at least the lower three ribs R4, R5, R6 out of the six ribs R1, R2, R3, R4, R5, R6 provided to the torso of the dummy P. More specifically, the lining cloth 70 overlaps rear portions of the ribs R3, R4, R5, R6 in seat side view, and an upper end of the lining cloth 70 is disposed so as to slightly overlap the rib R2 in seat side view.

As illustrated in FIG. 3, a vehicle width direction outer side edge (front edge) 70A of the lining cloth 70 is stitched to a vehicle width direction outer side edge (front edge) of the lower section 36L and to a front edge of the outer side cover 38 at the planned splitting portion (seam) S3. A vehicle width direction inner side edge (rear edge) 70B of the lining cloth 70 is stitched to a vehicle width direction inner side edge (rear edge) of the lower section 36L and to a vehicle width direction outer side edge of the upper section 36U at the seam S1.

Operation and Advantageous Effects

Next, explanation follows regarding operation and advantageous effects of the present exemplary embodiment.

In the present exemplary embodiment, when the side impact ECU 46 detects a side collision using a signal from the side impact sensor 48, the inflator 44 housed inside the rear chamber 58 of the side airbag body 50 is activated by the side impact ECU 46. Gas from the inflator 44 is thus supplied into the rear chamber 58, and the rear chamber 58 starts to inflate and deploy. The inner bag 60, whose interior is in communication with the interior of the front portion 58F of the rear chamber 58, inflates early within the outer side section 16A of the seatback 16 on receipt of gas supplied from the interior of the rear chamber 58. The gas supplied into the rear chamber 58 is supplied to the front chamber 56 through the upper and lower communication openings 54A, 54B such that the front chamber 56 starts to inflate and deploy with a delay.

The inner bag 60 that inflates early, as described above, pushes the seated occupant P toward the vehicle width direction inner side while receiving a reaction force from the inner wall 24C of the outer side-frame 24. This thereby enables the seated occupant P to be moved toward the vehicle width direction inner side early, and thereby enables effective protection of the seated occupant P even in cases in which the vehicle body side section (configured by the door trim 80 and the B-pillar garnish 82) will intrude to a large extent toward the vehicle width direction inner side due to the impact of the side collision.

Moreover, in the present exemplary embodiment, the lower section 36L of the outer front side cover 36 configuring part of the seatback cover 32 is interposed between the inflated inner bag 60 and the belly B and the chest C of the seated occupant P. The lining cloth 70 that stretches less readily than the lower section 36L (the outer front side cover 36) is bound to the back face of the lower section 36L. Stretching of the lower section 36L due to the inflation pressure of the inner bag 60 is thereby suppressed. This thereby enables the force with which the inner bag 60 pushes the seated occupant P (occupant-pushing force of the inner bag 60) to be prevented from becoming excessively large as a result of stretching of the lower section 36L (part of the seatback cover 32), even when the seatback cover 32 including the lower section 36L (the outer front side cover 36) is configured from a material that stretches readily (a knitted material in this example).

Namely, the present exemplary embodiment enables the occupant-pushing force (occupant-restraint force) of the inner bag 60 to be prevented from becoming excessively large, even when, for example, a side airbag device 14 in which the occupant-pushing force of the inner bag 60 is set on the high side, so as to be adapted for a genuine leather seatback cover, has been installed in a seat body 12 in which the seatback cover 32 is configured from a knitted material. As a result, the occurrence of what is referred to as a side effect, in which the occupant sustains injury from the inflation pressure of the side airbag 42, is prevented. Moreover, common side airbag devices 14 with the same specification can be employed without modification in vehicle seats that are set with seat covers (seatback covers, seat cushion covers) that have different materials to each other according to the grade of vehicle etc. This enables a reduction in manufacturing costs. Moreover, the occupant-restraint force of the inner bag 60 can be made uniform between vehicle seats that are set with seat covers having different coefficients of extension, thereby facilitating the realization of the utmost extent of occupant-restraint force of the inner bag 60.

Note that a configuration might be considered in which the lining cloth 70 is not bound to the back face of the lower section 36L (the outer front side cover 36), and the lining cloth 70 is simply interposed between the outer pad side portion 30B and the outer front side cover 36. However, the effect of suppressing stretching of the outer front side cover 36 is greater when the lining cloth 70 is bound to the back face of the outer front side cover 36.

Moreover, in the present exemplary embodiment, the inflated inner bag 60 overlaps the rear portion of the six ribs R1, R2, R3, R4, R5, R6 provided to the torso of the AM50 world side impact dummy P in seat side view. Accordingly, the rear portion of the six ribs R1, R2, R3, R4, R5, R6 are pushed toward the vehicle width direction inner side by the inner bag 60. Note that out of the six ribs R1, R2, R3, R4, R5, R6, the four lower ribs R3, R4, R5, R6 in particular are at locations including the chest C and the belly B of the seated occupant P (locations with relatively low resistance values for a human body) where the ribs are more likely to be damaged. It is therefore not desirable for these locations to receive excessive pushing force from the inner bag 60. Regarding this point, in the present exemplary embodiment, the lining cloth 70 bound to the back face of the lower section 36L of the outer front side cover 36 is disposed so as to overlap rear portions of the four ribs R3, R4, R5, R6 in seat side view. Accordingly, stretching of the lower section 36L is suppressed in a region overlapping with the rear portion of the four ribs R3, R4, R5, R6 in seat side view, thereby enabling the chest C and the belly B of the dummy P (seated occupant P) to be prevented from receiving an excessively large pushing force from the inner bag 60.

Figure 6:
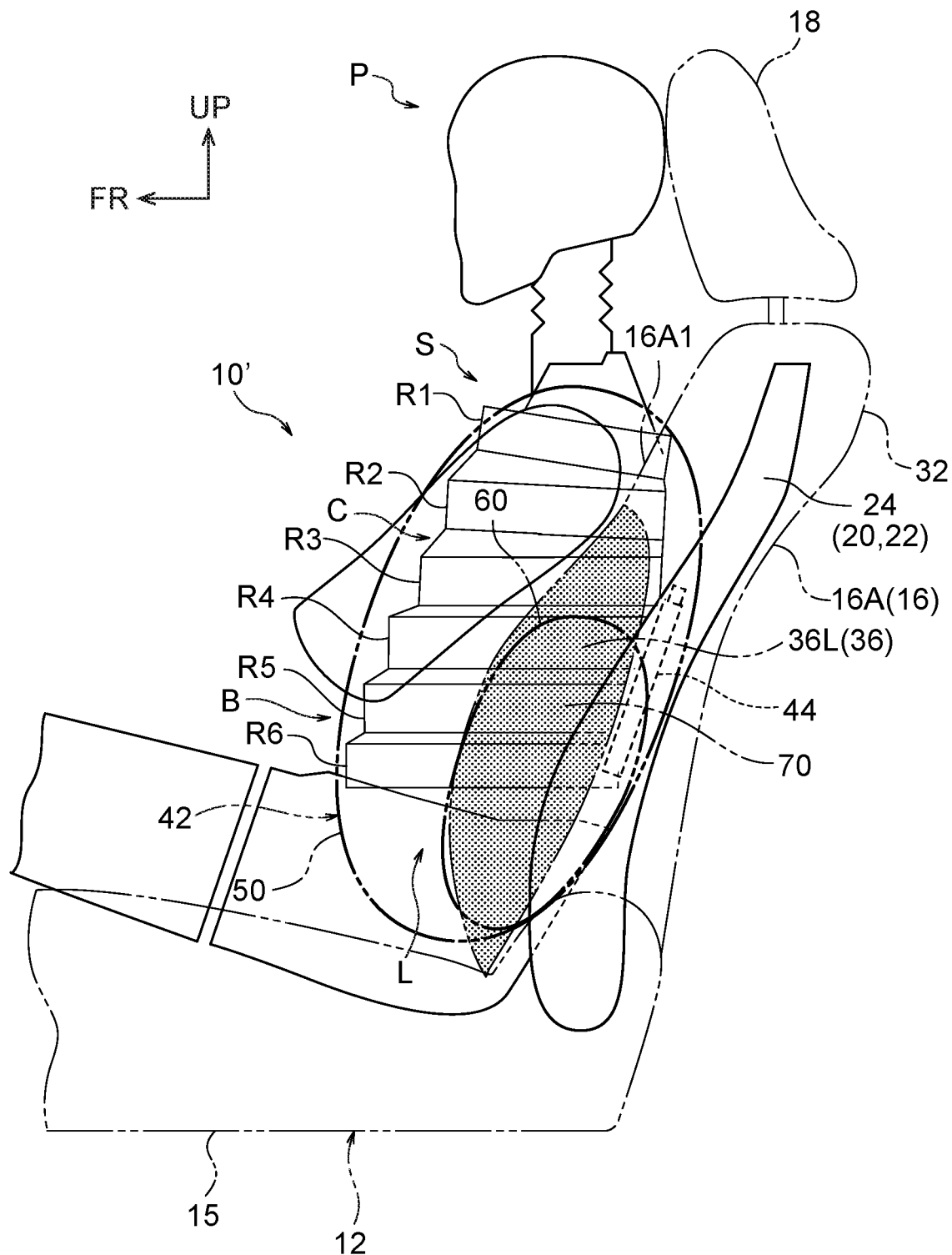
FIG. 6 is a side view corresponding to FIG. 1, illustrating a modified example of the first exemplary embodiment.

Note that in the first exemplary embodiment described above, the inflated inner bag 60 is configured so as to overlap rear portions of the ribs R1, R2, R3, R4, R5, R6 of the dummy P in seat side view. However, the present disclosure is not limited thereto, and the size of the inner bag 60 may be modified as appropriate. For example, as in a side airbag device-installed vehicle seat 10' (modified example) illustrated in FIG. 6, the inflated inner bag 60 may be configured so as to overlap rear portions of the ribs R4, R5, R6 of the dummy P in seat side view, but not to overlap rear portions of the ribs R1, R2, R3 in seat side view. Namely, a configuration may be adopted in which the inflated inner bag 60 does not push (restrain) the upper side of the chest C or the shoulders S of the seated occupant P.

Next, explanation follows regarding other exemplary embodiments of the present disclosure. Note that for configurations and operation basically the same as that of the exemplary embodiment already described, the same reference numerals are applied as in the exemplary embodiment already described, and explanation thereof is omitted.

Second Exemplary Embodiment

Figure 7:
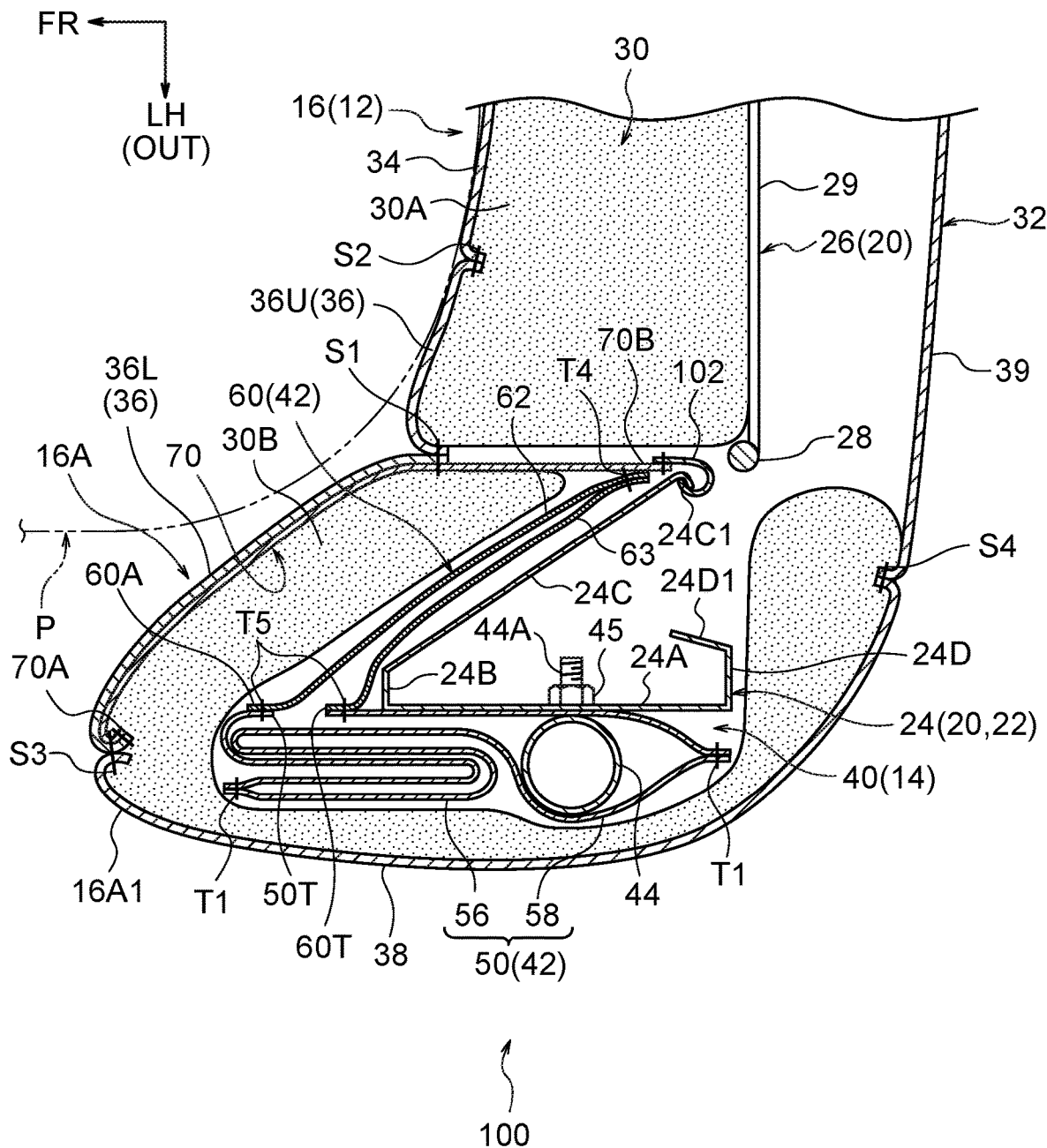
FIG. 7 is a cross-section corresponding to FIG. 3, illustrating a partial configuration of a side airbag device-installed vehicle seat according to a second exemplary embodiment of the present disclosure.

FIG. 7 is a cross-section corresponding to FIG. 3, illustrating partial configuration of a side airbag device-installed vehicle seat 100 according to a second exemplary embodiment of the present disclosure. In the present exemplary embodiment, the lining cloth 70 is extended to the vehicle rear of the rear edge of the lower section 36L of the outer front side cover 36 (the location where the seam S1 is set). Plural hooks (coupling members) 102 made from resin or metal are fixed to a vehicle width direction inner side edge (rear edge) 70B of the lining cloth 70 by a method such as stitching. The plural hooks 102 are arranged in a row along the vertical direction of the seatback 16. The hooks 102 are each formed with a substantially J-shaped cross-section profile, and are hooked onto the leading end 24C1 of the inner wall 24C of the outer side-frame 24. The rear edge 70B of the lining cloth 70 is thus coupled (anchored) to the outer side-frame 24 toward the rear (toward the back) within the seatback 16.

The present exemplary embodiment is similar to the first exemplary embodiment with the exception of the configurations described above. The present exemplary embodiment accordingly obtains the same basic operation and advantageous effects as those of the first exemplary embodiment. Moreover, in the present exemplary embodiment, the front edge 70A of the lining cloth 70 is joined to the planned splitting portion S3, and the rear edge 70B of the lining cloth 70 is coupled to the outer side-frame 24. Inflation pressure of the side airbag 42, including the inner bag 60 thus acts, via the lining cloth 70, as tensile force on the planned splitting portion S3. This enables the planned splitting portion S3 to be split smoothly, thereby enabling the deployment performance of the side airbag body 50 to be improved.

Third Exemplary Embodiment

Figure 8:
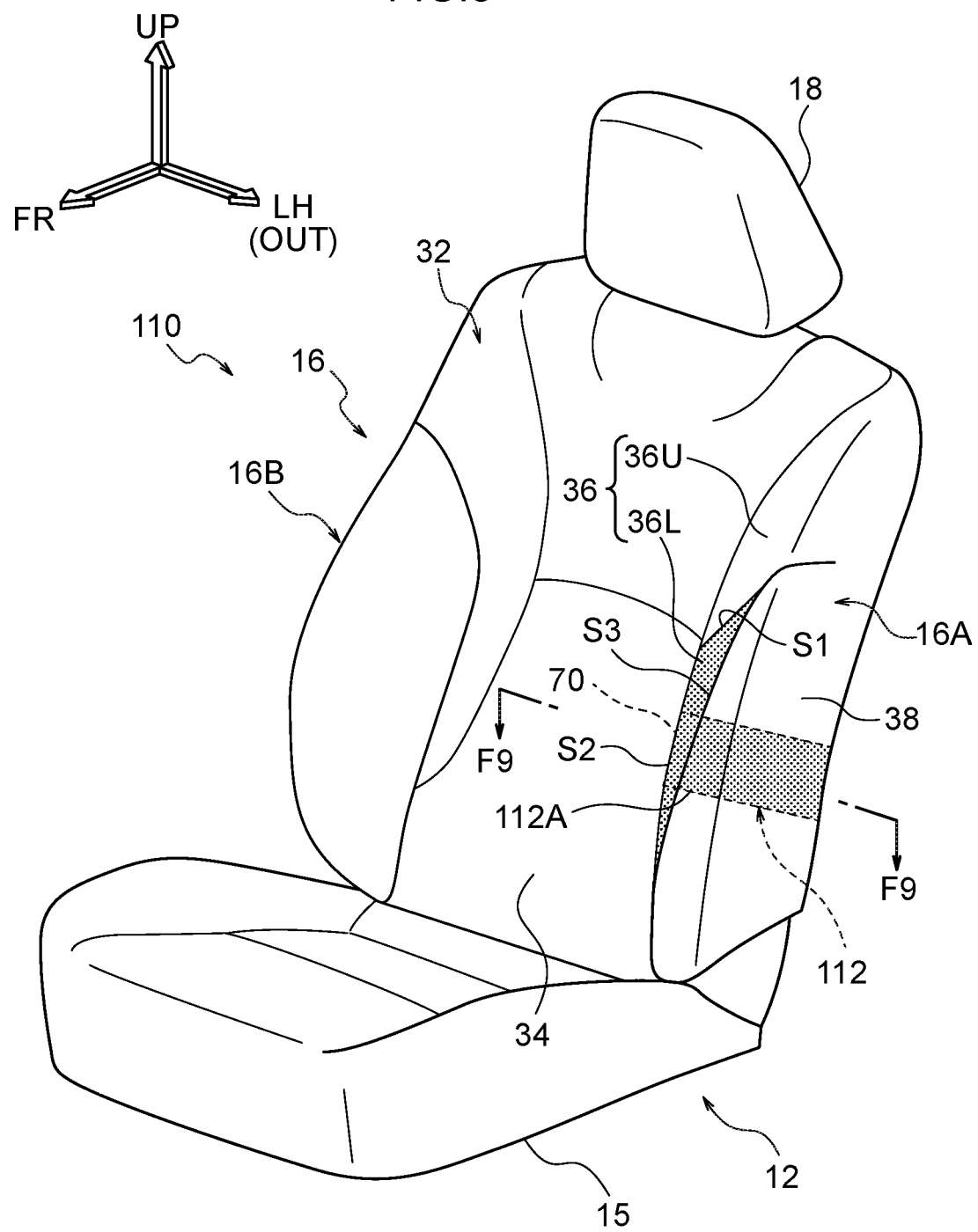
FIG. 8 is a perspective view illustrating a side airbag device-installed vehicle seat according to a third exemplary embodiment of the present disclosure, as viewed obliquely from the front left of the vehicle, and illustrating a stowed state of a side airbag.
Figure 9:
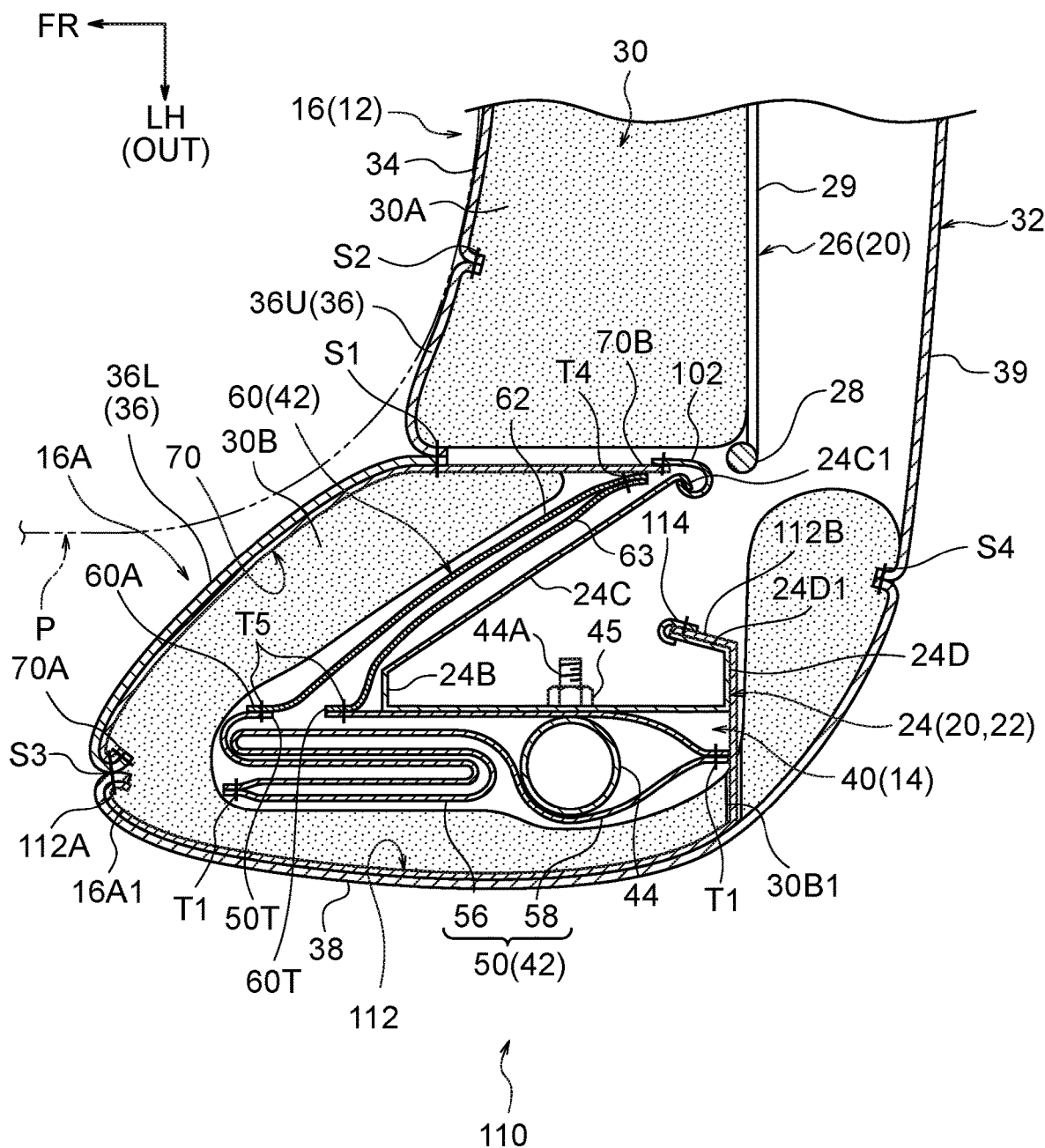
FIG. 9 is an enlarged cross-section illustrating a plane sectioned along line F9-F9 in FIG. 8.

FIG. 8 is a perspective view illustrating a side airbag device-installed vehicle seat 110 according to a third exemplary embodiment of the present disclosure, as viewed obliquely from the front left of the vehicle. FIG. 9 is an enlarged cross-section illustrating a plane sectioned along line F9-F9 in FIG. 8. In the present exemplary embodiment, similarly to in the second exemplary embodiment, the rear edge 70B of the lining cloth 70 is coupled to the outer side-frame 24 (see FIG. 9).

Moreover, in the present exemplary embodiment, a reinforcement cloth (narrow-width reinforcement cloth) 112 is disposed following the back face of the outer side cover 38. The reinforcement cloth 112 is formed by cutting out an elongated strap shape from a sheet-shaped material similar to the material used for the lining cloth 70, and stretches less readily than the outer side cover 38. The reinforcement cloth 112 is disposed with its length direction along the vehicle front-rear direction, and is set with a dimension sufficiently smaller than that of the lining cloth 70 in the 16 vertical direction (is formed with a narrow width vertically). The reinforcement cloth 112 is disposed so as to overlap with a vertical direction central portion of the lining cloth 70, or thereabouts, in seat side view.

A front edge (one length direction end portion) 112A of the reinforcement cloth 112 is stitched at the planned splitting portion (seam) S3 to a front edge of the outer side cover 38, to a vehicle width direction outer side edge (front edge) of the lower section 36L, and to a vehicle width direction outer side edge (front edge) of the lining cloth 70. A rear edge (the other length direction end side) of the reinforcement cloth 112 is inserted through a hole 30B1 penetrating a rear portion of the outer pad side portion 30B. A rear edge 112B of the reinforcement cloth 112 is fixed to a hook (coupling member) 114 made from resin or metal by a method such as stitching. The hook 114 is formed with a substantially J-shaped cross-section profile, and hooks onto the leading end 24D1 of the rear flange 24D of the outer side-frame 24. The rear edge 112B of the reinforcement cloth 112 is thereby coupled (anchored) to the outer side-frame 24 at the rear (the back side) of the interior of the seatback 16.

The present exemplary embodiment is similar to the second exemplary embodiment with the exception of the configurations described above. The present exemplary embodiment thus obtains the same basic operation and advantageous effects as those of the second exemplary embodiment. Moreover, in the present exemplary embodiment, the reinforcement cloth 112, which stretches less readily than the outer side cover 38, is disposed following the back face of the outer side cover 38. The front edge 112A of the reinforcement cloth 112 is joined to the planned splitting portion S3 of the seatback cover 32, and the rear edge 112B is coupled to the outer side-frame 24. The inflation pressure of the side airbag 42 therefore acts, via not only the lining cloth 70 but also via the reinforcement cloth 112, as tensile force on the planned splitting portion S3. This thereby enables the planned splitting portion S3 to be split open even more smoothly, thereby enabling a further improvement to the deployment performance of the side airbag body 50.

Moreover, the reinforcement cloth 112 is set with a dimension sufficiently smaller than that of the lining cloth 70 in the vertical direction of the seatback 16. Due to the reinforcement cloth 112 having a small dimension in the vertical direction of the seatback 16 receiving inflation pressure from the side airbag 42 and pulling the planned splitting portion S3, tensile force is concentrated on part of the planned splitting portion S3 (the portion where the front edge 112A of the reinforcement cloth 112 is stitched). The planned splitting portion S3 can thus be split smoothly (reliably) from this portion.

Fourth Exemplary Embodiment

Figure 10:
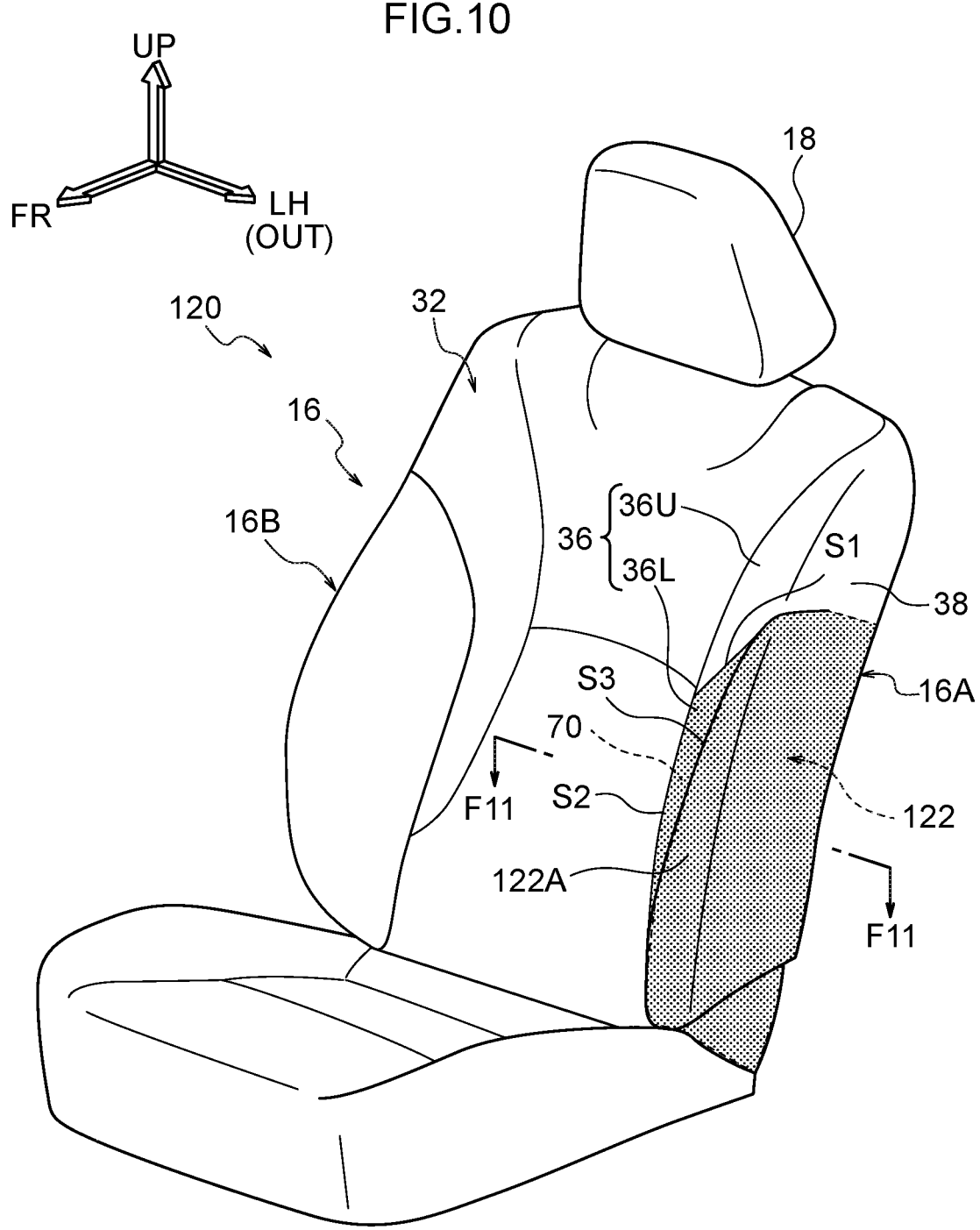
FIG. 10 is a perspective view illustrating a side airbag device-installed vehicle seat according to a fourth exemplary embodiment of the present disclosure, as viewed obliquely from the front left of the vehicle, and illustrating a stowed state of a side airbag.
Figure 11:
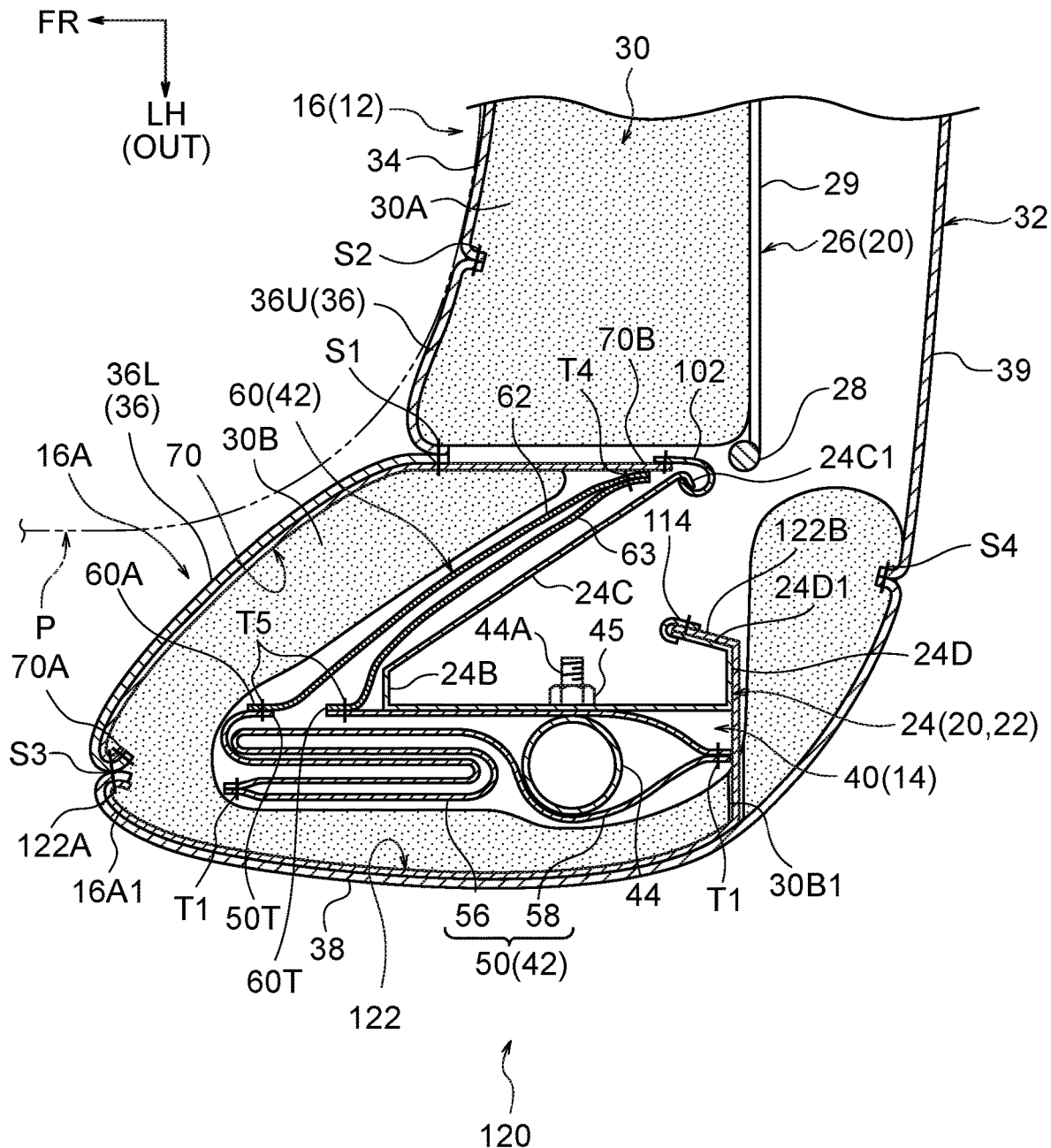
FIG. 11 is an enlarged cross-section illustrating a plane sectioned along line F11-F11 in FIG. 10.

FIG. 10 is a perspective view illustrating a side airbag device-installed vehicle seat 120 according to a fourth exemplary embodiment of the present disclosure, as viewed obliquely from the front left of the vehicle. FIG. 11 is an enlarged cross-section illustrating a plane sectioned along line F11-F11 in FIG. 10. In the present exemplary embodiment, similarly to in the second and third exemplary embodiments, the rear edge 70B of the lining cloth 70 is coupled to the outer side-frame 24 (see FIG. 11).

Moreover, in the present exemplary embodiment, an outer lining cloth 122 is disposed following the back face of the outer side cover 38. The outer lining cloth 122 corresponds to "another low extendibility member" of the present disclosure. The outer lining cloth 122 is formed by cutting out a substantially elongated rectangle from a sheet-shaped material similar to the material used for the lining cloth 70, and stretches less readily than the outer side cover 38. The outer lining cloth 122 is disposed with its length direction in the vehicle vertical direction, and is overlaid on the back face of a vertical direction intermediate portion and lower portion of the outer side cover 38. The outer lining cloth 122 has a dimension in the vertical direction of the seatback 16 set the same as, or slightly larger than, the dimension of the lining cloth 70 in the vertical direction of the seatback 16. The outer lining cloth 122 is disposed so as to overlap with the lining cloth 70 in seat side view.

A front edge (one length direction end) 122A of the outer lining cloth 122 is stitched to the front edge of the outer side cover 38, to the vehicle width direction outer side edge (front edge) of the lower section 36L, and to the vehicle width direction outer side edge (front edge) of the lining cloth 70 at the planned splitting portion (seam) S3. A rear edge side (the other length direction end side) of the outer lining cloth 122 is inserted through a hole 30B1 penetrating a rear portion of the outer pad side portion 30B. The rear edge 122B of the outer lining cloth 122 is fixed to plural hooks (coupling members) 114 made from resin or metal by a method such as stitching. The plural hooks 114 form a row along the vertical direction of the seatback 16. The hooks 114 are each formed with a substantially J-shaped cross-section profile, and hook onto the leading end 24D1 of the rear flange 24D of the outer side-frame 24. The rear edge 122B of the outer lining cloth 122 is thereby coupled (anchored) to the outer side-frame 24 at the rear side (the back side) of the interior of the seatback 16.

The present exemplary embodiment is similar to the second exemplary embodiment with the exception of the configurations described above. The present exemplary embodiment thus obtains the same basic operation and advantageous effects as those of the second exemplary embodiment. Moreover, in the present exemplary embodiment, the outer lining cloth 122, which stretches less readily than the outer side cover 38, is disposed following the back face of the outer side cover 38. The front edge 122A of the outer lining cloth 122 is joined to the planned splitting portion S3 of the seatback cover 32, and the rear edge 122B thereof is coupled to the outer side-frame 24. The inflation pressure of the side airbag 42 therefore acts, via not only the lining cloth 70 but also via the outer lining cloth 122, as tensile force on the planned splitting portion S3. This thereby enables the planned splitting portion S3 to be split open even more smoothly, thereby enabling a further improvement to the deployment performance of the side airbag body 50.

Supplementary Explanation of the Exemplary Embodiments

In each of the exemplary embodiments described above, the side airbag 42 is configured by what is referred to as a near-side airbag, installed within the outer side section 16A (side section on the vehicle width direction outer side) of the seatback 16. However, the present disclosure is not limited thereto. Namely, the side airbag may be what is referred to as a far-side airbag, installed within a side section on the vehicle width direction inner side of a seatback. Such cases are configured such that, in a side collision, the seated occupant P in the vehicle seat positioned on the opposite side to the collision side is pushed toward the opposite side to the collision side by an inner bag of the far-side airbag.

In each of the exemplary embodiments described above, gas from the single inflator 44 housed in the rear chamber 58 of the side airbag body 50 is supplied into the inner bag 60 through the communication opening 50T. However, the present disclosure is not limited thereto. Namely, a configuration may be adopted in which a side airbag body, which is the body of the side airbag, and an inner bag, are independently formed as bag bodies, and separate inflators are disposed in the side airbag body and in the inner bag.

Various other modifications may be implemented within a range not departing from the spirit of the present disclosure. The scope of rights of the present disclosure is obviously not limited to the exemplary embodiments described above.

What is claimed is:

1. A side airbag device-installed vehicle seat comprising:
   a side frame disposed within a side section of a seatback;
   a side airbag disposed within the side section of the seatback, the side airbag being configured to receive gas supplied from an inflator so as to inflate and deploy alongside a seated occupant, the side airbag including:
      a side airbag body configured to inflate and deploy between the seated occupant and a vehicle body side section, and
      an inner bag configured to inflate between the side frame and the seated occupant, and when inflated, the inner bag being configured to push the seated occupant toward an inner side in a vehicle width direction;
   a front side cover forming a part of a cover of the seatback and facing the inner bag, the front side cover being configured to be interposed between the inner bag and the seated occupant when the inner bag is inflated; and
   a first low extendibility member configured to stretch less readily than the front side cover, the first low extendibility member having a sheet shape and being bound to an entire back face of a lower section of the front side cover.

2. The side airbag device-installed vehicle seat of claim 1, wherein when the seated occupant is an AM50 world side impact dummy and the inner bag is inflated, the inner bag and the first low extendibility member overlap with rear portions of at least a lower three ribs of six ribs provided at a torso of the dummy in a seat side view.

3. The side airbag device-installed vehicle seat of claim 1, wherein:
   the cover of the seatback includes a side cover joined to the front side cover at a planned splitting portion formed at a front edge of the side section of the seatback,
   the planned splitting portion is configured to split open upon receiving inflation pressure from the side airbag,
   a front edge of the first low extendibility member is joined to the planned splitting portion, and
   a rear edge of the first low extendibility member is coupled to the side frame.

4. The side airbag device-installed vehicle seat of claim 3, further comprising a second low extendibility member configured to stretch less readily than the side cover, the second low extendibility member being disposed so as to follow a back face of the side cover, the second low extendibility member having a front edge joined to the planned splitting portion and a rear edge coupled to the side frame.

5. The side airbag device-installed vehicle seat of claim 4, wherein the second low extendibility member is a reinforcement cloth with a smaller dimension in a vertical direction of the seatback than a dimension of the first low extendibility member in the vertical direction of the seatback.

6. The side airbag device-installed vehicle seat of claim 4, wherein the second low extendibility member overlaps with a vertical direction central portion of the first low extendibility member in a seat side view.

7. The side airbag device-installed vehicle seat of claim 4, wherein the second low extendibility member has a dimension in a vertical direction of the seatback equal to or larger than a dimension of the first low extendibility member in the vertical direction of the seatback.

8. The side airbag device-installed vehicle seat of claim 3, wherein the side frame includes a reaction force surface extending obliquely inward in the vehicle width direction from a seat front to a seat rear side.

9. The side airbag device-installed vehicle seat of claim 8, wherein:
   the side frame is formed by an outer wall, a front wall, an inner wall, and a rear flange; and
   the reaction force surface is formed by the inner wall and extends obliquely from a seat width direction inner side end of the front wall.

10. The side airbag device-installed vehicle seat of claim 9, wherein:
   the front edge of the first low extendibility member is joined to the planned splitting portion, and
   the rear edge of the first low extendibility member is coupled to a leading end of the inner wall.

* * * * *